United States Patent
Hammond et al.

(10) Patent No.: US 11,474,294 B2
(45) Date of Patent: Oct. 18, 2022

(54) GRATING COUPLERS WITH SEGMENTS HAVING SECTIONS OF INVERTED CURVATURE

(71) Applicant: GLOBALFOUNDRIES U.S. Inc., Santa Clara, CA (US)

(72) Inventors: Alec Hammond, Atlanta, GA (US); Yusheng Bian, Ballston Lake, NY (US); Michal Rakowski, Ballston Lake, NY (US); Won Suk Lee, Malta, NY (US); Asif J. Chowdhury, Clifton Park, NY (US); Roderick A. Augur, Saratoga Springs, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/162,303

(22) Filed: Jan. 29, 2021

(65) Prior Publication Data
US 2022/0244457 A1 Aug. 4, 2022

(51) Int. Cl.
*G02B 6/124* (2006.01)
*G02B 6/13* (2006.01)
*G02B 6/12* (2006.01)

(52) U.S. Cl.
CPC ............ *G02B 6/124* (2013.01); *G02B 6/13* (2013.01); *G02B 2006/12107* (2013.01)

(58) Field of Classification Search
CPC .................................. G02B 6/34; G02B 6/124
See application file for complete search history.

(56) References Cited

U.S. PATENT DOCUMENTS

| 5,838,844 A * | 11/1998 | Van Dam | G02B 6/126 385/11 |
| 6,445,853 B1 * | 9/2002 | Kashihara | G02B 6/12023 385/37 |
| 10,557,994 B1 * | 2/2020 | Lee | G02B 6/34 |
| 2009/0220193 A1 * | 9/2009 | Dragone | G02B 6/12011 385/24 |

FOREIGN PATENT DOCUMENTS

| CN | 106959482 A * | 7/2017 | G02B 5/1838 |
| WO | WO-2015052017 A1 * | 4/2015 | A61B 6/4035 |

OTHER PUBLICATIONS

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

(Continued)

*Primary Examiner* — Charlie Y Peng
(74) *Attorney, Agent, or Firm* — Thompson Hine LLP; Francois Pagette

(57) ABSTRACT

Structures including a grating coupler and methods of forming a structure that includes a grating coupler. The grating coupler includes segments that are spaced along a longitudinal axis. Each segment is inclined relative to the longitudinal axis. Each segment includes a first curved section having a first curvature and a second curved section having a second curvature that is inverted relative to the first curvature.

18 Claims, 5 Drawing Sheets

(56) References Cited

OTHER PUBLICATIONS

Logan Su, et al., "Fully-automated optimization of grating couplers," Opt. Express 26, 4023-4034 (2018).
M. Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.
N. V. Sapra et al., "Inverse Design and Demonstration of Broadband Grating Couplers," in IEEE Journal of Selected Topics in Quantum Electronics, vol. 25, No. 3, pp. 1-7, May-Jun. 2019, doi: 10.1109/JSTQE.2019.2891402.
Michaels A, Yablonovitch E., "Inverse design of near unity efficiency perfectly vertical grating couplers", Opt Express. Feb. 19, 2018;26(4):4766-4779.

\* cited by examiner

GRATING COUPLERS WITH SEGMENTS HAVING SECTIONS OF INVERTED CURVATURE

BACKGROUND

The present invention relates to photonics chips and, more particularly, to structures including a grating coupler and methods of forming a structure that includes a grating coupler.

Photonics chips are used in many applications and systems such as data communication systems and data computation systems. A photonics chip integrates optical components, such as waveguides, optical switches, grating couplers, and polarizers, and electronic components, such as field-effect transistors, into a unified platform. Among other factors, layout area, cost, and operational overhead may be reduced by the integration of both types of components in the photonics chip.

Grating couplers are commonly used in photonics chips to provide antennas in Light Detection and Ranging (LIDAR) systems, as well as to provide antennas in silicon photonics phased arrays. Grating couplers can direct laser pulses off-chip at a given emission angle or receive laser pulses. Conventional grating couplers may have low efficiencies or lack compactness, and may not be robust to fabrication variability.

Improved structures including a grating coupler and methods of forming a structure that includes a grating coupler are needed.

SUMMARY

In an embodiment of the invention, a structure includes a grating coupler having a plurality of segments spaced along a longitudinal axis. Each segment is inclined relative to the longitudinal axis. Each segment includes a first curved section having a first curvature and a second curved section having a second curvature that is inverted relative to the first curvature.

In an embodiment of the invention, a method includes forming a grating coupler including a plurality of segments spaced along a longitudinal axis. Each segment is inclined relative to the longitudinal axis. Each segment includes a first curved section having a first curvature and a second curved section having a second curvature that is inverted relative to the first curvature.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
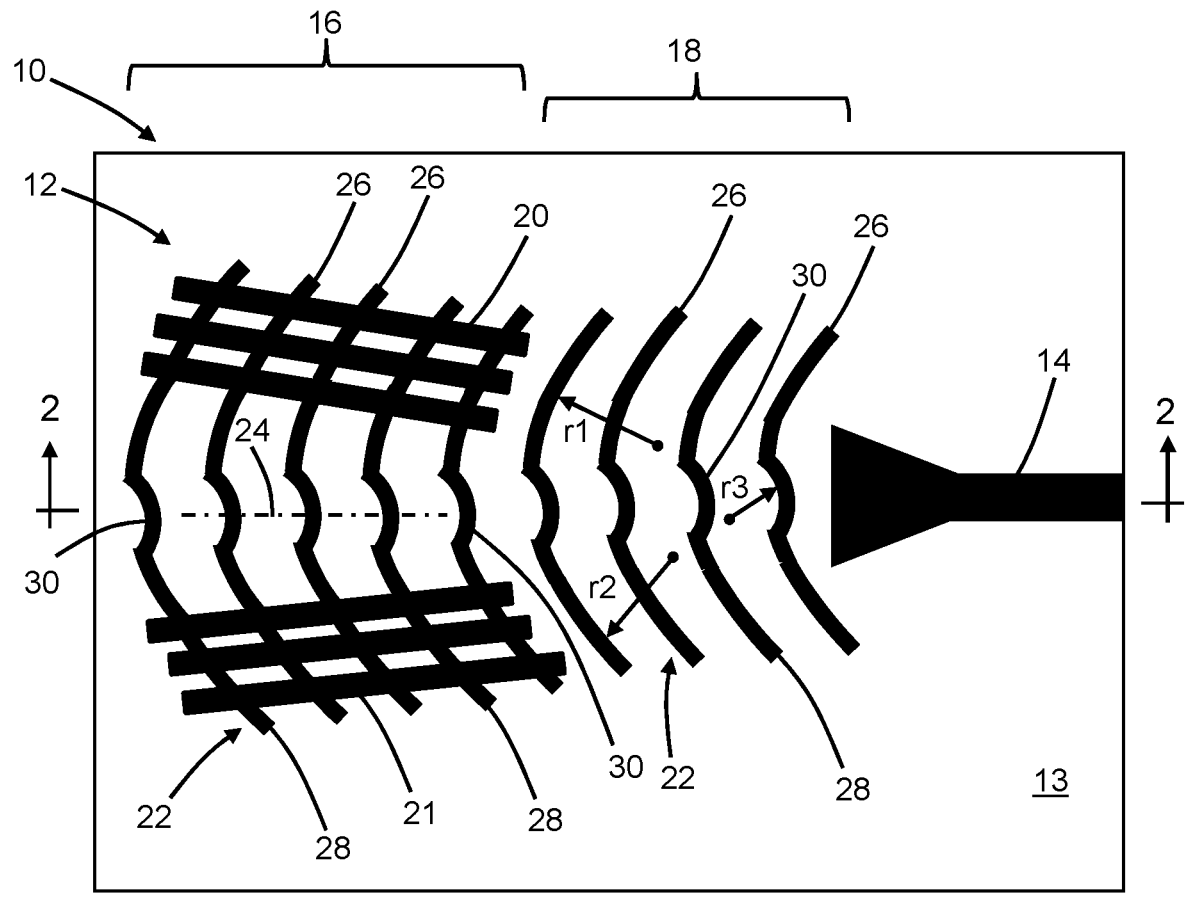
FIG. 1 is a top view of a photonics chip including a structure at an initial fabrication stage of a processing method in accordance with embodiments of the invention.
Figure 2:
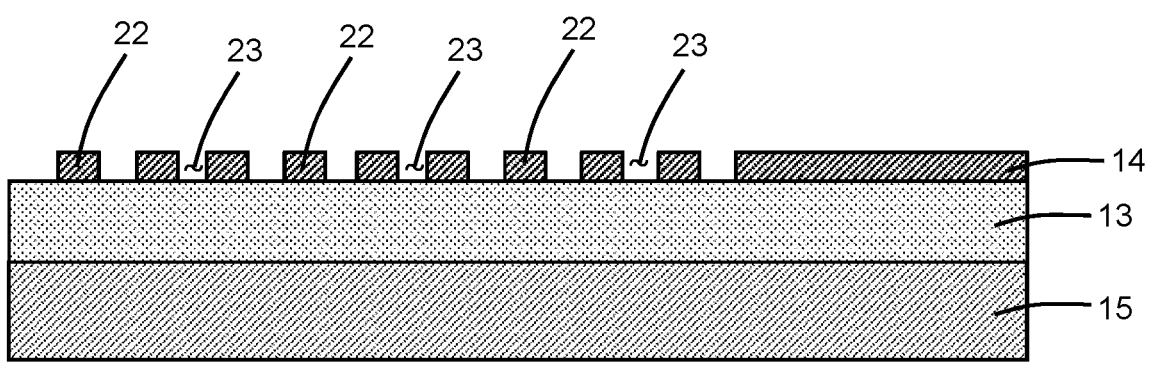
FIG. 2 is a cross-sectional view of the structure taken generally along line 2-2 in FIG. 1.

With reference to FIGS. 1, 2 and in accordance with embodiments of the invention, a structure 10 includes a grating coupler 12 and a waveguide core 14 that is adjacent to the grating coupler 12. The waveguide core 14 may include a taper that is located immediately adjacent to the grating coupler 12. The grating coupler 12 and waveguide core 14 are positioned on and over a dielectric layer 13. The grating coupler 12 may include grating structures or segments 22 that are separated by grooves 23. The waveguide core 14 may be aligned with a longitudinal axis 24, and the segments 22 may be aligned with and spaced by the grooves 23 along the longitudinal axis 24. In an embodiment, the segments 22 may be spaced with a uniform pitch and a uniform duty cycle to define a periodic arrangement. In an alternative embodiment, the segments 22 may be spaced with a non-uniform pitch and/or a non-uniform duty cycle to define an apodized (i.e., aperiodic) arrangement.

The grating coupler 12 and the waveguide core 14 may be comprised of the same material. In an embodiment, the grating coupler 12 and the waveguide core 14 may be comprised of a single-crystal semiconductor material, such as single-crystal silicon. In an embodiment, the single-crystal semiconductor material may originate from a device layer of a silicon-on-insulator (SOI) substrate that further includes a buried oxide layer providing the dielectric layer 13 and a handle substrate 15 comprised of a single-crystal semiconductor material, such as single-crystal silicon. The grating coupler 12 and the waveguide core 14 may be patterned from the device layer by lithography and etching processes. The device layer may be fully etched to define the grating coupler 12 and waveguide core 14. Alternatively, the device layer may only be partially etched to define a thinned residual layer on the dielectric layer 13 that connects respective lower portions of the segments 22 of the grating coupler 12 and that is connected to a lower portion of the waveguide core 14. In alternative embodiments, the grating coupler 12 and waveguide core 14 may be comprised of a different type of material, such as a dielectric material like silicon nitride or polycrystalline silicon.

The grating coupler 12 includes a region 16 having multiple features 20, 21 that intersect the segments 22 and a region 18 that is free of features similar to the features 20, 21. The region 18 of the grating coupler 12 is positioned between the region 16 of the grating coupler 12 and the waveguide core 14.

Each segment 22 is angled or inclined in the layout of the grating coupler 12 relative to the longitudinal axis 24. Each segment 22 may include a section 26, a section 28, and a section 30 that are lengthwise arranged relative to the longitudinal axis 24. The segments 22 may be positioned with a given pitch along the longitudinal axis 24, and the section 30 may be intersected by the longitudinal axis 24. Within each segment 22, the section 30 is positioned along the length of the segment 22 between the section 26 and the section 28, and the section 30 may directly connect the section 26 to the section 28. Within each segment 22, the section 26 and the section 28 may be symmetrically arranged relative to the section 30. In an embodiment, the segments 22 located in the region 16 of the grating coupler 12 and the segments 22 located in the region 18 of the grating coupler 12 may have equal or substantially equal lengths.

The section 26 of each segment 22 may extend over a curved or curvilinear path in the layout of the grating coupler 12 and may have a given curvature over its curved arc length. The section 28 of each segment 22 may extend over a curved or curvilinear path in the layout of the grating coupler 12 and may have a given curvature over its curved arc length. The section 30 of each segment 22 may extend over a curved or curvilinear path in the layout of the grating coupler 12 and may have a given curvature over its curved arc length. The curvature of the sections 30 is reversed or inverted relative to the curvature of the sections 26 and is reversed or inverted relative to the curvature of the sections 28. The sections 30 of the segments 22 may be intersected by the longitudinal axis 24 and, in an embodiment, the sections 30 may be centered about the longitudinal axis 24. The curvature of the section 30 of each segment 22 may define a concavity that faces in a direction away from the waveguide core 14. The respective curvatures of the sections 26, 28 of each segment 22 may define a concavity that faces in a direction toward the waveguide core 14, which is opposite from the direction in which the concavity defined by the curvature of the section 30 faces.

For each segment 22, the section 30 has an inner radius r3 and an outer radius that are centered on one side of the segment 22, the section 26 has an inner radius r1 and an outer radius that are centered on an opposite side of the segment 22 from the vertex of the section 30, and the section 28 has an inner radius r2 and an outer radius that are centered on an opposite side of the segment 22 from the vertex of the section 30. In an embodiment, the curvature of the section 26, the section 28, and the section 30 of each segment 22 may be constant over their respective curved arc lengths. In an embodiment, the sections 26 and 28 of each segment 22 may have equal curvatures (i.e., equal inner radii and equal outer radii). In an embodiment, the section 26, the section 28, and the section 30 of each segment 22 may trace smooth curves having a continuously turning tangent over their respective lengths.

Each of the features 20 intersects more than one of the sections 26 of the segments 22 in the region 16 of the grating coupler 12. As a group, the features 20 intersect different portions of each section 26 that have different spacings in a lateral direction relative to the longitudinal axis 24 and relative to the sections 30. The features 20, which are strips or bars in the representative embodiment, may be inclined at an angle relative to the longitudinal axis 24. In an embodiment, the features 20 may be spaced with a uniform pitch and a uniform duty cycle to define a periodic arrangement. In an alternative embodiment, the features 20 may be spaced with a non-uniform pitch and/or a non-uniform duty cycle to define an apodized (i.e., aperiodic) arrangement.

Each of the features 21 intersects more than one of the sections 28 of the segments 22 in the region 16 of the grating coupler 12. As a group, the features 21 intersect different portions of each section 28 that have different spacings in a lateral direction relative to the longitudinal axis 24 and relative to the sections 30. The features 21, which are strips or bars in the representative embodiment, may be inclined at an angle relative to the longitudinal axis 24. The features 21, which are strips or bars in the representative embodiment, may be inclined at an angle relative to the longitudinal axis 24. In an embodiment, the features 21 may be spaced with a uniform pitch and a uniform duty cycle to define a periodic arrangement. In an alternative embodiment, the features 21 may be spaced with a non-uniform pitch and/or a non-uniform duty cycle to define an apodized (i.e., aperiodic) arrangement.

The features 20 may be angled with an inclination angle relative to the longitudinal axis 24, and the features 21 may also be angled with an inclination angle relative to the longitudinal axis 24. The inclination angle of the features 20 and the inclination angle of the features 21, which are in different rotational directions (e.g., clockwise and counterclockwise) relative to the longitudinal axis 24, may have equal absolute values. In an alternative embodiment, the inclination angles of the features 20 and the features 21 may have substantially equal absolute values. In an alternative embodiment, the inclination angles of the features 20 and the features 21 may have unequal absolute values.

Figure 3:
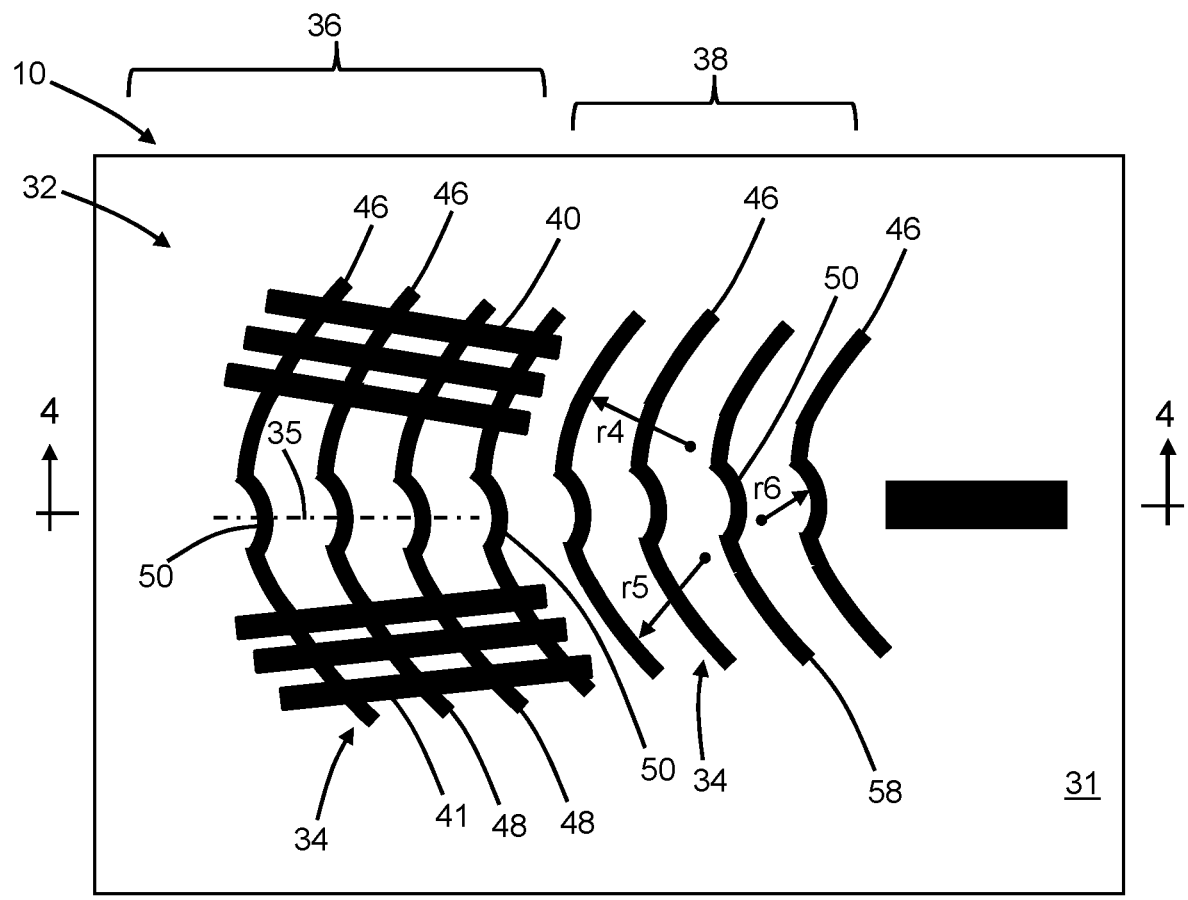
FIG. 3 is a top view of the structure at a fabrication stage subsequent to FIG. 1.
Figure 4:
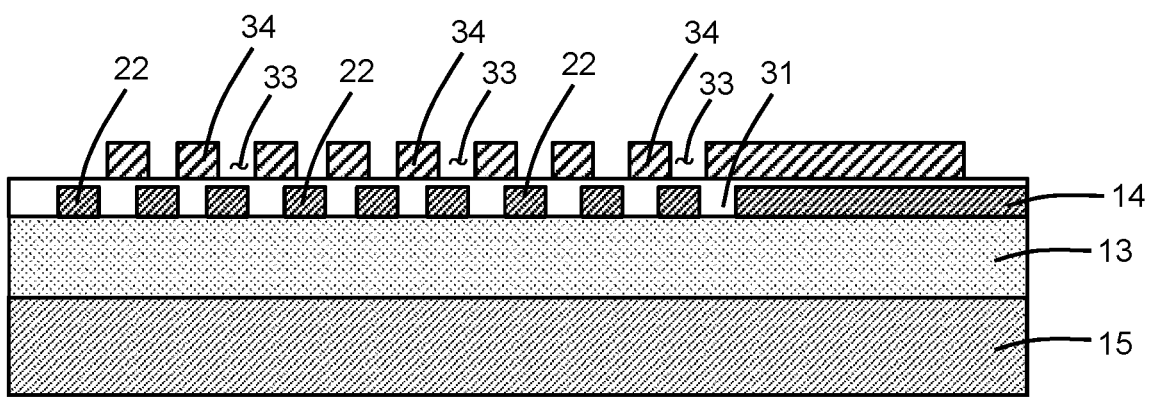
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 31 is formed over the grating coupler 12 and the waveguide core 14. The dielectric layer 31 may be comprised of a dielectric material, such as silicon dioxide, deposited by chemical vapor deposition and planarized by, for example, chemical-mechanical polishing to remove topography. The segments 22 are embedded or buried in the dielectric material of the dielectric layer 31 such that the inter-segment grooves 23 are filled by the dielectric material of the dielectric layer 31.

The structure 10 may further include a grating coupler 32 that is positioned over the grating coupler 12 in a different level of the structure 10 than the grating coupler 12 and waveguide core 14. In an embodiment, the grating coupler 32 may be positioned on the dielectric layer 31. In an embodiment, the grating coupler 32 may be positioned in direct contact with the dielectric layer 31. The grating coupler 32 may include grating structures or segments 34 that are separated by grooves 33. In an embodiment, the segments 34 may have a uniform pitch and a uniform duty cycle to define a periodic arrangement. In an alternative embodiment, the segments 34 may have a non-uniform pitch and/or a non-uniform duty cycle to define an apodized (i.e., aperiodic) arrangement.

The grating coupler 32 may be comprised of a different material than the grating coupler 12 and the waveguide core 14. In an embodiment, the grating coupler 32 may be comprised of a material having a different composition than the material of the grating coupler 12. In an embodiment, the grating coupler 32 may be comprised of a material having a different crystallinity than the material of the grating coupler 12. In an embodiment, the grating coupler 32 may be comprised of a polycrystalline semiconductor material, such as polycrystalline silicon. In an embodiment, the grating coupler 32 may be comprised of a dielectric material, such as silicon nitride. In an alternative embodiment, both of the grating couplers 12, 32 may be comprised of the same material. In an alternative embodiment, both of the grating couplers 12, 32 may be comprised of a dielectric material, such as silicon nitride. The grating coupler 32 may be patterned from a deposited layer by lithography and etching processes. The deposited layer may be fully etched to define the grating coupler 32 or, alternatively, only partially etched to define a thinned residual layer on the dielectric layer 31 that connects respective lower portions of the segments 34 of the grating coupler 32.

The grating coupler 32 includes a region 36 having multiple features 40, 41 that intersect the segments 34 and a region 38 that is free of features similar to the features 40, 41. The region 36 of the grating coupler 32 may be positioned over the region 16 of the grating coupler 12, and the region 38 of the grating coupler 32 may be positioned over the region 18 of the grating coupler 12.

Each segment 34 is inclined in the layout of the grating coupler 12 relative to the longitudinal axis 35. Each segment 34 may include a section 46, a section 48, and a section 50 that are lengthwise arranged relative to the longitudinal axis 35. The segments 34 may be positioned with a given pitch along the longitudinal axis 35, and the section 50 may be intersected by the longitudinal axis 35. The longitudinal axis 35 may be aligned parallel or substantially parallel to the longitudinal axis 24 (FIG. 1). Within each segment 34, the section 50 is positioned along the length of the segment 34 between the section 46 and the section 48, and the section 50 may directly connect the section 46 to the section 48. Within each segment 34, the section 46 and the section 48 may be symmetrically arranged relative to the section 50. In an embodiment, the segments 34 located in the region 36 of the grating coupler 32 and the segments 22 located in the region 38 of the grating coupler 32 may have equal or substantially equal lengths.

The section 46 of each segment 34 may extend over a curved or curvilinear path in the layout of the grating coupler 32 and may have a given curvature over its curved arc length. The section 48 of each segment 34 may extend over a curved or curvilinear path in the layout of the grating coupler 32 and may have a given curvature over its curved arc length. The section 50 of each segment 34 may extend over a curved or curvilinear path in the layout of the grating coupler 32 and may have a given curvature over its curved arc length. The curvature of the sections 50 is reversed or inverted relative to the curvature of the sections 46 and is reversed or inverted relative to the curvature of the sections 48. The sections 50 of the segments 34 may be intersected by the longitudinal axis 35 and, in an embodiment, the sections 50 may be centered about the longitudinal axis 35. The curvature of the section 50 of each segment 34 may define a concavity that faces away from the waveguide core 14. The respective curvatures of the sections 46, 48 of each segment 34 may define a concavity that faces toward the waveguide core 14.

For each segment 34, the section 50 has an inner radius r6 and an outer radius that are centered on one side of the segment 34, the section 46 has an inner radius r4 and an outer radius that are centered on an opposite side of the segment 34 from the vertex of the section 50, and the section 48 has an inner radius r4 and an outer radius that are centered on an opposite side of the segment 34 from the vertex of the section 50. In an embodiment, the curvature of the section 46, the section 48, and the section 50 of each segment 34 may be constant over their respective curved arc lengths. In an embodiment, the sections 46 and 48 of each segment 34 may have equal curvatures (i.e., equal inner radii and equal outer radii). In an embodiment, the section 46, the section 48, and the section 50 of each segment 34 may trace smooth curves having a continuously turning tangent over their respective lengths.

The sections 46, 48, 50 of the segments 34 of grating coupler 32 may be positioned above and over the sections 26, 28, 30 of the segments 22 of the grating coupler 12 with an overlapping arrangement. In an embodiment, the segments 34 of the grating coupler 32 may be offset longitudinally relative to the segments 22 of the grating coupler 12 such that the overlapping arrangement is longitudinally offset.

In an embodiment, the pattern of the segments 34 of the grating coupler 32 may be identical or substantially identical to the pattern of the segments 22 of the grating coupler 12. In an alternative embodiment, the pattern of the segments 34 of the grating coupler 32 may differ from the pattern of the segments 22 of the grating coupler 12. In an embodiment, the number of segments 34 in the grating coupler 32 may differ from the number of segments 22 in the grating coupler 12. In an embodiment, the segments 34 of the grating coupler 32 may have a different pitch and/or duty cycle than the segments 22 of the grating coupler 12. In an embodiment, the curvatures of the sections 46 of the segments 34 in the grating coupler 32 may differ from the curvatures of the sections 26 of the segments 22 in the grating coupler 12. In an embodiment, the curvatures of the sections 48 of the segments 34 in the grating coupler 32 may differ from the curvatures of the sections 28 of the segments 22 in the grating coupler 12. In an embodiment, the curvatures of the sections 50 of the segments 34 in the grating coupler 32 may differ from the curvatures of the sections 30 of the segments 22 in the grating coupler 12.

Each of the features 40 intersects more than one of the sections 46 of the segments 34 in the region 36 of the grating coupler 32. As a group, the features 40 intersect different portions of each region 36 that have different spacings in a lateral direction relative to the longitudinal axis 35 and relative to the sections 50. The features 40, which are strips or bars in the representative embodiment, may be inclined at an angle relative to the longitudinal axis 35. In an embodiment, the features 40 may be spaced with a uniform pitch and a uniform duty cycle to define a periodic arrangement. In an alternative embodiment, the features 40 may be spaced with a non-uniform pitch and/or a non-uniform duty cycle to define an apodized (i.e., aperiodic) arrangement.

Each of the features 41 intersects more than one of the sections 46 of the segments 34 in the region 36 of the grating coupler 32. As a group, the features 41 intersect different portions of each region 36 that have different spacings in a lateral direction relative to the longitudinal axis 35 and relative to the sections 50. The features 41, which are strips or bars in the representative embodiment, may be inclined at an angle relative to the longitudinal axis 35. In an embodiment, the features 41 may be spaced with a uniform pitch and a uniform duty cycle to define a periodic arrangement. In an alternative embodiment, the features 41 may be spaced with a non-uniform pitch and/or a non-uniform duty cycle to define an apodized (i.e., aperiodic) arrangement. In an embodiment, the features 40 may have the same shape and/or be arranged in the same pattern as the features 41.

The features 40 may be angled with an inclination angle relative to the longitudinal axis 35, and the features 41 may also be angled with an inclination angle relative to the longitudinal axis 35. The inclination angle of the features 40 and the inclination angle of the features 41, which are in different rotational directions (e.g., clockwise and counterclockwise) relative to the longitudinal axis 35, may have equal absolute values. In an alternative embodiment, the inclination angles of the features 40 and the features 41 may have substantially equal absolute values. In an alternative embodiment, the inclination angles of the features 40 and the features 41 may have unequal absolute values.

The features 40 may be positioned over the features 20 of the grating coupler 12 with an overlapping arrangement. In an embodiment, the features 40 may be offset transversely relative to the features 20 such that the overlapping arrangements are offset. In an embodiment, the pattern of the features 40 may be identical or substantially identical to the pattern of the features 20 of the grating coupler 12. In an alternative embodiment, the pattern of the features 40 may differ from the pattern of the features 20 of the grating coupler 12. In an embodiment, the number of features 40 may differ from the number of features 20 in the grating coupler 12. In an embodiment, the shape of the features 40 may differ from the shape of the features 20 of the grating coupler 12. In an embodiment, the features 40 and the features 20 of the grating coupler 12 may have equal pitches and/or equal duty cycles. In an embodiment, the features 40 may have a different pitch and/or duty cycle than the features 20 of the grating coupler 12.

The features 41 may be positioned over the features 21 of the grating coupler 12 with an overlapping arrangement. In an embodiment, the features 41 may be offset transversely relative to the features 21 such that the overlapping arrangements are offset. In an embodiment, the pattern of the features 41 may be identical or substantially identical to the pattern of the features 21 of the grating coupler 12. In an alternative embodiment, the pattern of the features 41 may differ from the pattern of the features 21 of the grating coupler 12. In an embodiment, the number of features 41 may differ from the number of features 21 in the grating coupler 12. In an embodiment, the shape of the features 41 may differ from the shape of the features 21 of the grating coupler 12. In an embodiment, the features 41 and the features 21 of the grating coupler 12 may have equal pitches and/or equal duty cycles. In an embodiment, the features 41 may have a different pitch and/or duty cycle than the features 21 of the grating coupler 12.

Figure 5:
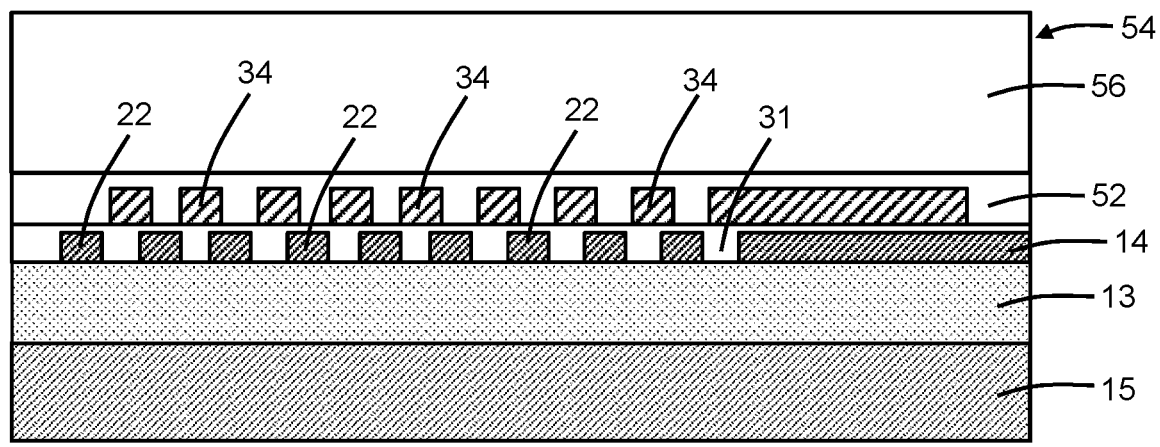
FIG. 5 is a cross-sectional view of the structure at a fabrication stage subsequent to FIG. 4.

With reference to FIG. 5 in which like reference numerals refer to like features in FIG. 4 and at a subsequent fabrication stage, a dielectric layer 52 is formed over the grating coupler 32. The dielectric layer 52 may be comprised of a dielectric material, such as silicon dioxide, deposited by chemical vapor deposition and planarized with, for example, chemical-mechanical polishing to remove topography. The segments 34 are embedded or buried in the dielectric material of the dielectric layer 52 such that the grooves 33 are filled by the dielectric material of the dielectric layer 52.

A back-end-of-line stack 54 may be formed by back-end-of-line (BEOL) processing over the dielectric layer 52 and the grating coupler 32. The back-end-of-line stack 54 may include one or more dielectric layers 56 comprised of a dielectric material, such as silicon dioxide, silicon nitride, or a low-k dielectric material.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

The grating coupler 12 is shaped like a fishbone with the sections 30 of the segments 22 positioned along the spine and having a curvature that is inverted relative to the curvatures of the sections 26 and 28. The grating coupler 12 includes features 20, 21 on both sides of the spine defined by the sections 30 of the segments 22. The features 20, 21 and the segments 22 are dimensioned and positioned so as not to diffract or reflect light at the wavelength of operation and act as an effective optical material, and therefore define metamaterials.

The grating coupler 32 is also shaped like a fishbone with the sections 50 of the segments 34 positioned along the spine and having a curvature that is inverted relative to the curvatures of the sections 46 and 48. The grating coupler 32 includes features 40, 41 on both sides of the spine defined by the sections 50 of the segments 34. The features 40, 41 and the segments 34 are dimensioned and positioned so as not to diffract or reflect light at the wavelength of operation and act as an effective optical material, and therefore define metamaterials.

The structure 10 may provide improvements in coupling efficiency, a footprint/form-factor reduction, and enhanced robustness and tolerance to fabrication variability. The structure 10 includes both of the grating couplers 12, 32 in the representative embodiment or, in an alternative embodiment, the structure 10 may only include either the grating coupler 12 or the grating coupler 32.

Figure 6:
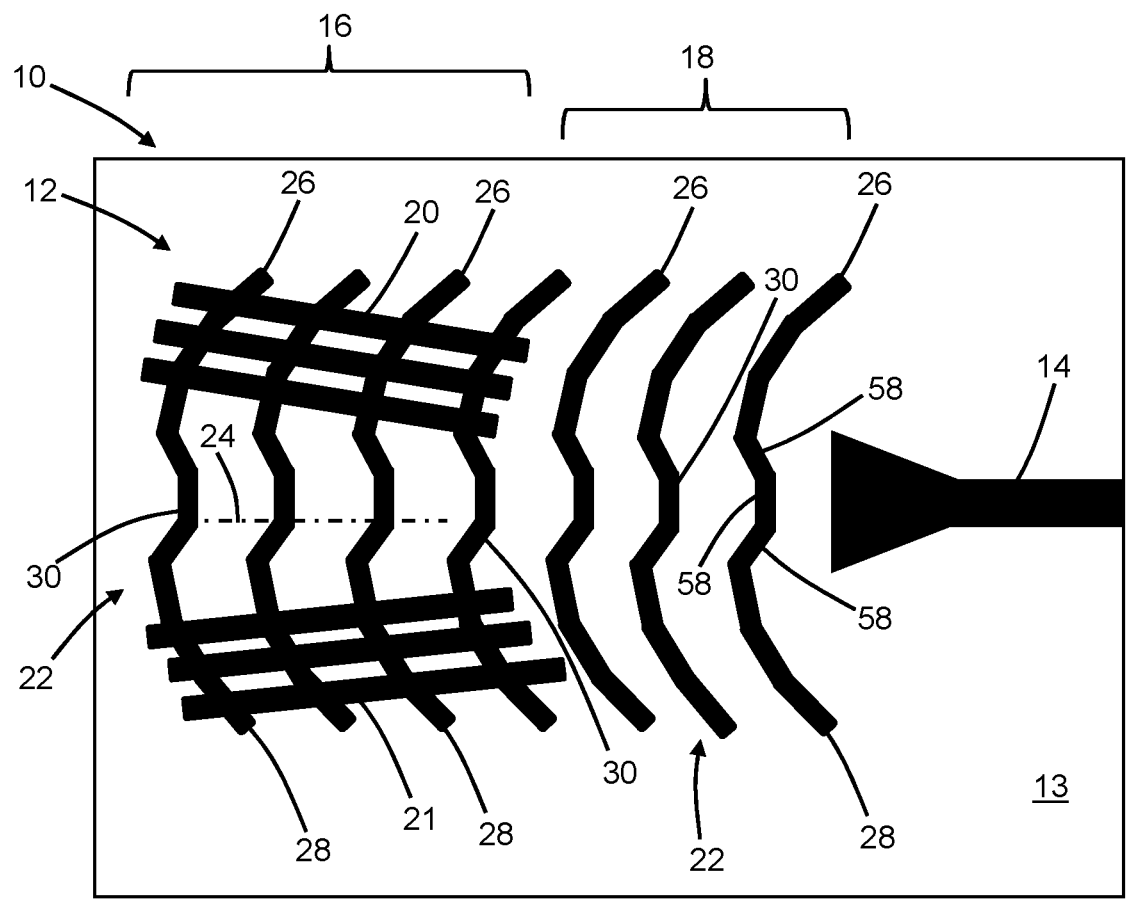
FIG. 6 is a top view of a structure in accordance with alternative embodiments of the invention.

With reference to FIG. 6 and in accordance with alternative embodiments, each of the sections 26, 28, 30 of the segments 22 of the grating coupler 12 may include polygonal shapes 58, instead of curved shapes, that are serially connected as line segments to define a piecewise linear curve defining the segments 22. For each segment 22, the section 30 has a curvature that is reversed or inverted relative to the curvature of the section 26 and the section 28. For example, each of the sections 26, 28, 30 may include three polygonal shapes 58, although the number may vary in different embodiments and may approximate curved shapes. In an alternative embodiment, each of the sections 46, 48, 50 of the segments 34 of the grating coupler 32 may include polygonal shapes, instead of curved shapes, that are similar to the polygonal shapes 58 and that are serially connected as line segments to define a piecewise linear curve defining the segments 34.

Figure 7:
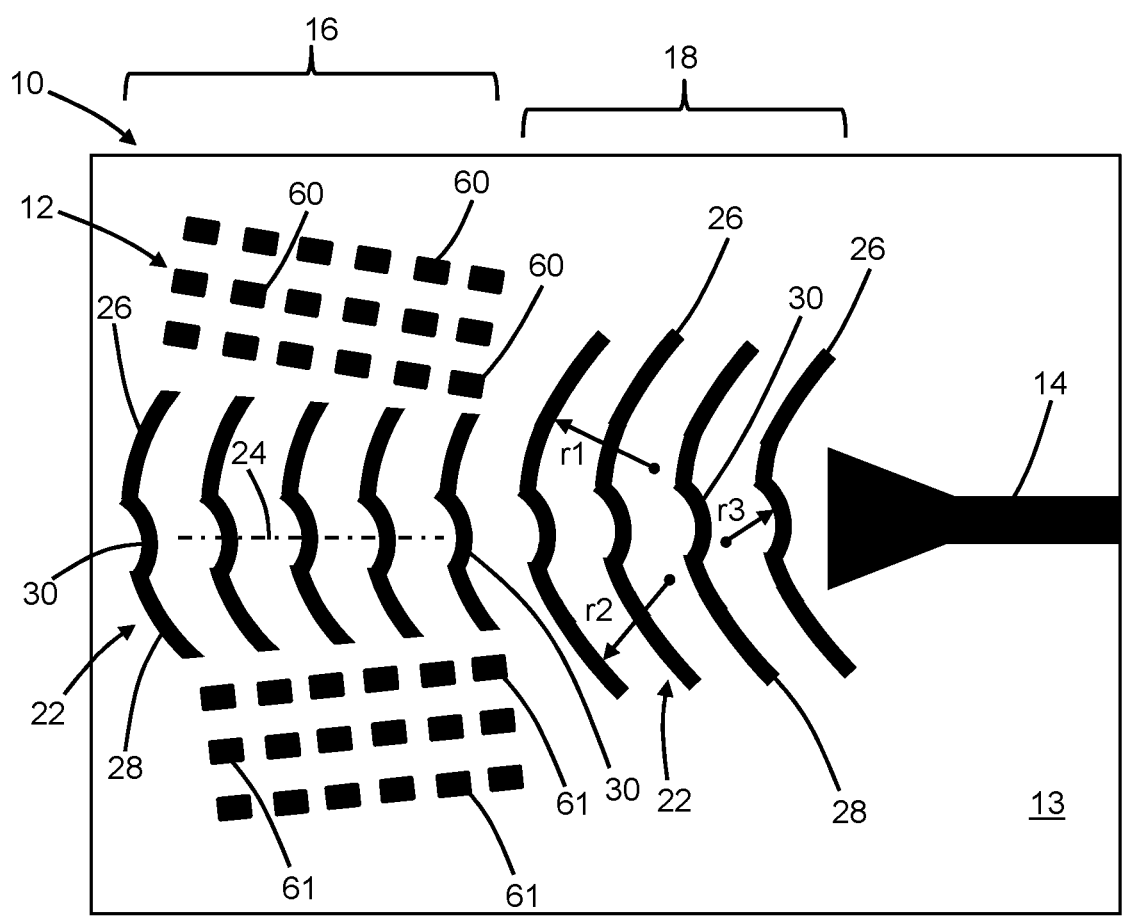
FIG. 7 is a top view of a structure in accordance with alternative embodiments of the invention.

With reference to FIG. 7 and in accordance with alternative embodiments, the structure 10 may be modified to include features 60 and features 61 that replace features 20, 21. The features 60 may be arranged in an array, such as a two-dimensional array having rows and columns, and the rows of the two-dimensional array may be inclined or tilted at an angle relative to the longitudinal axis 24. The features 61 may be arranged in an array, such as a two-dimensional array having rows and columns, and the rows of the two-dimensional array may be inclined or tilted at an angle relative to the longitudinal axis 24. In the representative embodiment, the features 60 may be rectangular in shape, and the features 61 may be rectangular in shape. In alternative embodiments, the features 60 and/or the features 61 may have a different shape, such as a round or disk shape.

The features 60 may be positioned to replace respective portions of the sections 26 of the segments 22 in the region 16 of the grating coupler 12. In this instance, the features 60 do not intersect the sections 26 of the segments 22 but are instead positioned laterally adjacent to the ends of truncated sections 26. The features 61 may be positioned to replace respective portions of the sections 28 of the segments 22 in the region 16 of the grating coupler 12. In this instance, the features 61 do not intersect the sections 28 of the segments 22 but are instead positioned laterally adjacent to the ends of the sections 28. The segments 22 located in the region 16 may have shorter lengths than the segments 22 located in the region 18.

In an embodiment, the features 40, 41 of the grating coupler 32 may be modified to include features that are similar to features 60, 61. In an embodiment, the features 40, 41 of the grating coupler 32 may be modified to include features that are similar to features 60, 61 and the features 20, 21 of the grating coupler 12 may be omitted. In an alternative embodiment, the features 40, 41 of the grating coupler 32 may be modified to include features that are similar to features 60, 61 and the features 20, 21 of the grating coupler 12 may be retained.

Figure 8:
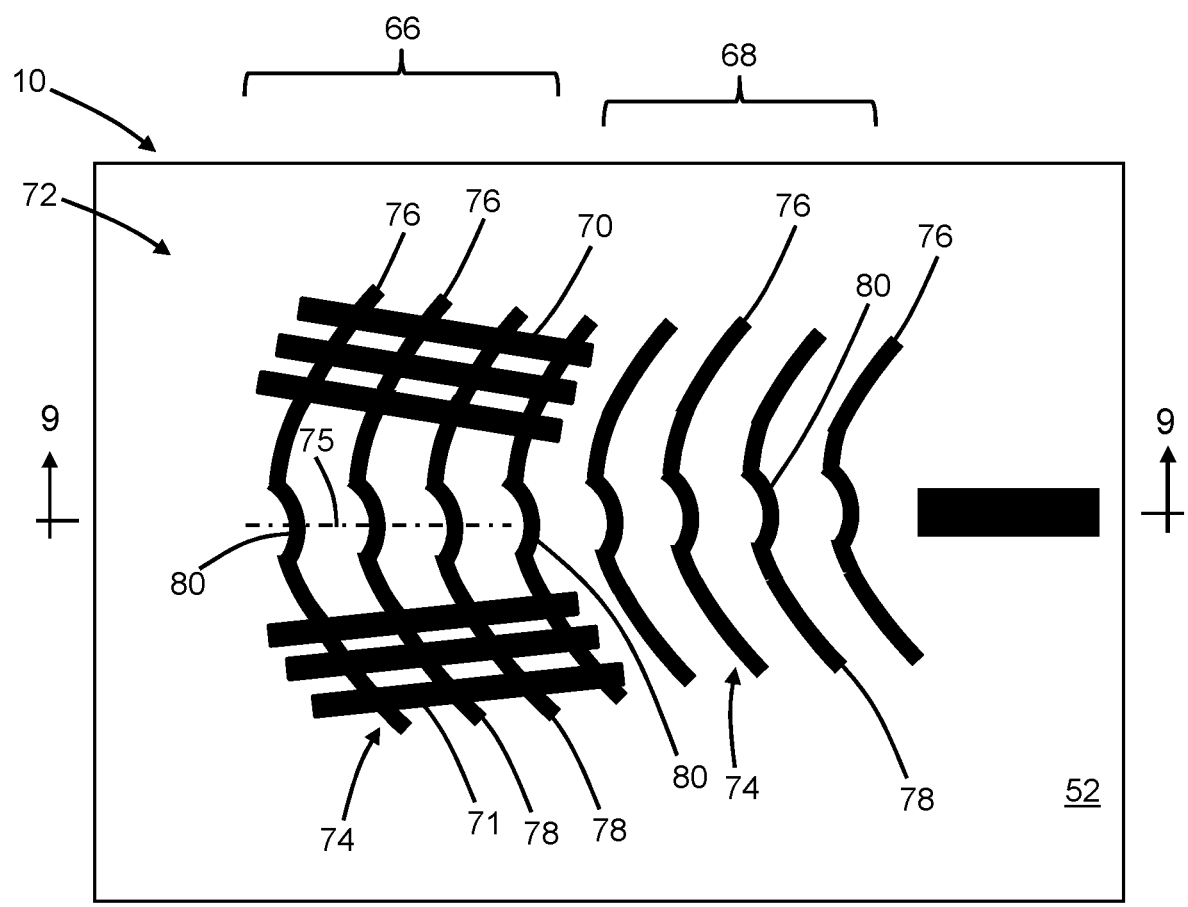
FIG. 8 is a top view of a structure in accordance with alternative embodiments of the invention.
Figure 9:
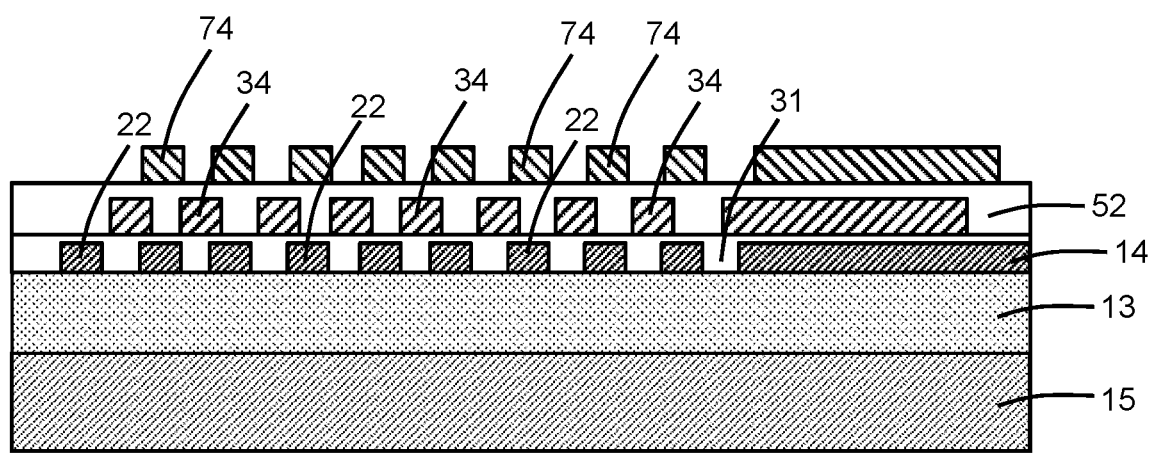
FIG. 9 is a cross-sectional view of the structure taken generally along line 9-9 in FIG. 8.

With reference to FIGS. 8, 9 and in accordance with alternative embodiments, the structure 10 may be modified to include another grating coupler 72 having grating structures or segments 74 that are positioned over the segments 34 of the grating coupler 32 in a different level of the structure 10. The construction of the grating coupler 72 may include sections 76, 78, 80 similar to the sections 46, 48, 50 of the grating coupler 32. The grating coupler 72 is positioned on the dielectric layer 52. The segments 74 of the grating coupler 72 are separated by grooves 73 and are spaced along a longitudinal axis 75. The grating coupler 32 is positioned in a vertical direction between the grating coupler 12 and the grating coupler 72.

The segments 74 are inclined in the layout of the grating coupler 72 relative to the longitudinal axis 75. The sections 76, 78, 80 of the segments 74 of grating coupler 72 are positioned over the sections 46, 48, 50 of the segments 34 of grating coupler 32 with an overlapping arrangement. The segments 74 of the grating coupler 72 may be offset longitudinally relative to the segments 34 of the grating coupler 32 such that the overlapping arrangements are offset in the longitudinal direction.

The grating coupler 72 includes a section 66 having multiple features 70, 71 that intersect the segments 34 and a section 68 that is free of features similar to the features 70, 71. The features 70, 71 may be similar in construction to features 40, 41 and features 20, 21.

The grating coupler 72 may be comprised of a different material than the material comprising the grating coupler 32 and a different material than the material comprising the grating coupler 12 and the waveguide core 14. For example, the grating coupler 72 may be comprised of silicon nitride, the grating coupler 32 may be comprised of polycrystalline silicon, and the grating coupler 12 may be comprised of single-crystal silicon.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first grating coupler including a first plurality of segments spaced along a first longitudinal axis, each of the first plurality of segments inclined relative to the first longitudinal axis, and each of the first plurality of segments including a first curved section having a first curvature, a second curved section having a second curvature that is inverted relative to the first curvature, and a third curved section having a third curvature that is inverted relative to the first curvature,
wherein the first curved section of each of the first plurality of segments is lengthwise positioned between the second curved section and the third curved section, and the first grating coupler further includes a plurality of features that intersect the second curved section of each of the first plurality of segments.

2. The structure of claim 1 wherein the first curved section of each of the first plurality of segments is intersected by the first longitudinal axis, and the third curvature is substantially equal to the second curvature.

3. The structure of claim 1 wherein each of the first plurality of segments is centered about the first longitudinal axis, and the third curvature is substantially equal to the second curvature.

4. The structure of claim 1 wherein the first curved section and the second curved section of each of the first plurality of segments includes a plurality of polygonal shapes.

5. The structure of claim 1 further comprising:
a waveguide core adjacent to the first plurality of segments of the first grating coupler,
wherein the first curved section of each of the first plurality of segments is oriented such that the first curvature faces away from the waveguide core.

6. The structure of claim 1 wherein the plurality of features are inclined at an angle relative to the first longitudinal axis.

7. The structure of claim 1 further comprising:
a second grating coupler positioned over the first grating coupler with a first overlapping arrangement, the second grating coupler including a second plurality of segments spaced along a second longitudinal axis, each of the second plurality of segments inclined relative to the second longitudinal axis, and each of the second plurality of segments including a first curved section having a first curvature and a second curved section having a second curvature that is inverted relative to the first curvature.

8. The structure of claim 7 wherein the first grating coupler comprises a first material and the second grating coupler comprises a second material different from the first material.

9. The structure of claim 8 wherein the first material comprises single-crystal silicon, and the second material comprises polysilicon or silicon nitride.

10. The structure of claim 7 further comprising:
a third grating coupler positioned between the first grating coupler and the second grating coupler with a second overlapping arrangement, the third grating coupler including a third plurality of segments spaced along a third longitudinal axis, each of the third plurality of segments inclined relative to the third longitudinal axis, and each of the third plurality of segments including a first curved section having a first curvature and a second curved section having a second curvature that is inverted relative to the first curvature.

11. The structure of claim 10 wherein the first grating coupler comprises a first material, the second grating coupler comprises a second material that is different from the first material, and the third grating coupler comprises a third material that is different from the first material and the second material.

12. A structure comprising:
a first grating coupler including a first plurality of segments spaced along a first longitudinal axis, each of the first plurality of segments inclined relative to the first longitudinal axis, and each of the first plurality of segments including a first curved section having a first curvature and a second curved section having a second curvature that is inverted relative to the first curvature; and
a second grating coupler positioned over the first grating coupler with a first overlapping arrangement, the second grating coupler including a second plurality of segments spaced along a second longitudinal axis, each of the second plurality of segments inclined relative to the second longitudinal axis, and each of the second plurality of segments including a first curved section having a first curvature and a second curved section having a second curvature that is inverted relative to the first curvature.

13. The structure of claim 12 wherein the first grating coupler comprises a first material and the second grating coupler comprises a second material different from the first material.

14. The structure of claim 13 wherein the first material comprises single-crystal silicon, and the second material comprises polysilicon or silicon nitride.

15. The structure of claim 12 further comprising:
a third grating coupler positioned between the first grating coupler and the second grating coupler with a second overlapping arrangement, the third grating coupler including a third plurality of segments spaced along a third longitudinal axis, each of the third plurality of segments inclined relative to the third longitudinal axis, and each of the third plurality of segments including a first curved section having a first curvature and a second curved section having a second curvature that is inverted relative to the first curvature.

16. The structure of claim 15 wherein the first grating coupler comprises a first material, the second grating coupler comprises a second material that is different from the first material, and the third grating coupler comprises a third material that is different from the first material and the second material.

17. The structure of claim 12 wherein each of the first plurality of segments includes a third curved section having a third curvature that is inverted relative to the first curvature, and each of the second plurality of segments includes a third curved section having a third curvature that is inverted relative to the first curvature.

18. A structure comprising:
a grating coupler including a first plurality of segments spaced along a first longitudinal axis and a plurality of structural features that are arranged adjacent to the first plurality of segments, each of the first plurality of segments inclined relative to the first longitudinal axis, and each of the first plurality of segments including a first curved section having a first curvature and a second curved section having a second curvature that is inverted relative to the first curvature,
wherein the plurality of structural features are arranged in a two-dimensional array.

\* \* \* \* \*